W. P. SHATTUCK.
COMPUTING MACHINE.
APPLICATION FILED MAR. 5, 1901. RENEWED DEC. 30, 1908.

966,248.

Patented Aug. 2, 1910.

7 SHEETS—SHEET 1.

Witnesses.
E. G. Staude
N. E. Gooley

Inventor.
WILLIAM P. SHATTUCK
By his Attorneys:
Paul & Hawley

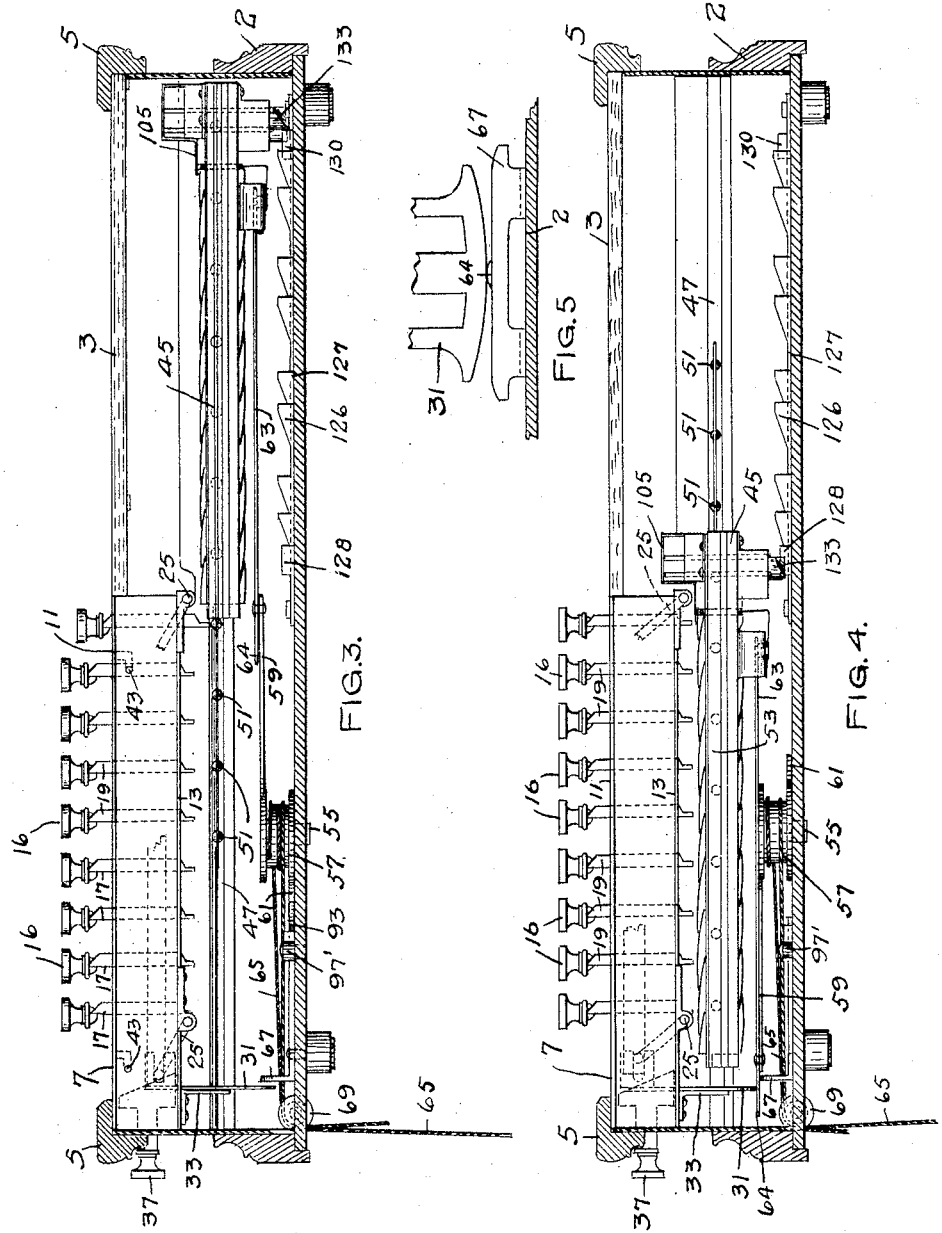

W. P. SHATTUCK.
COMPUTING MACHINE.
APPLICATION FILED MAR. 5, 1901. RENEWED DEC. 30, 1908.

966,248.

Patented Aug. 2, 1910.
7 SHEETS—SHEET 4.

Witnesses.

Inventor.
WILLIAM P. SHATTUCK
By his Attorneys.

W. P. SHATTUCK.
COMPUTING MACHINE.
APPLICATION FILED MAR. 5, 1901. RENEWED DEC. 30, 1908.
966,248.
Patented Aug. 2, 1910.
7 SHEETS—SHEET 5.
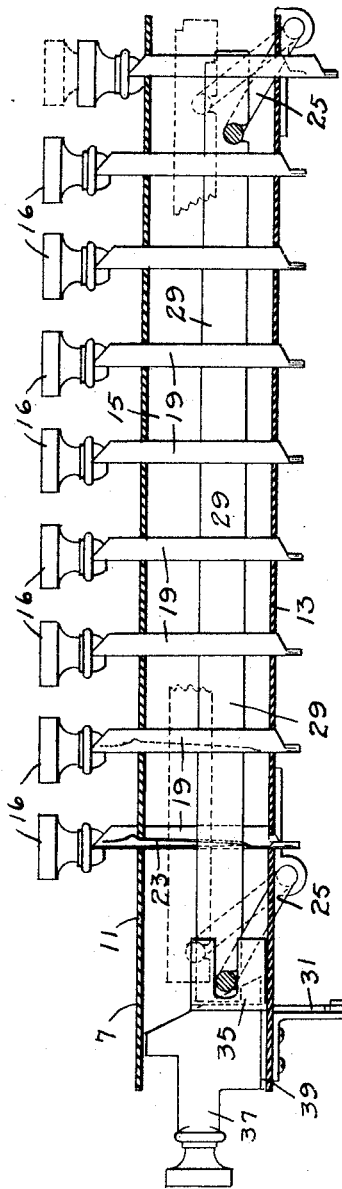
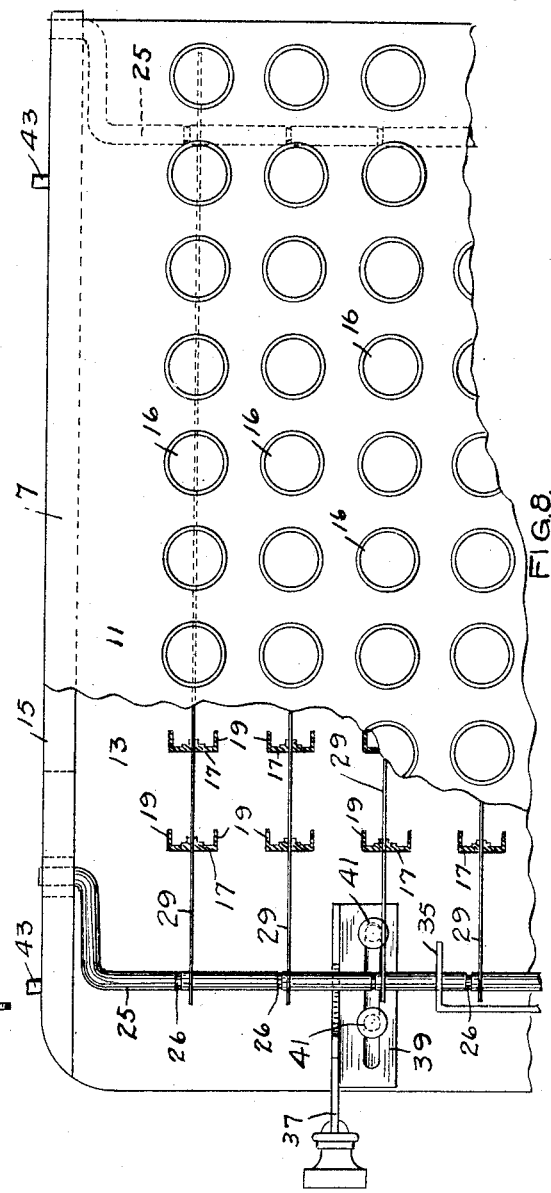
Witnesses.
Inventor.
WILLIAM P. SHATTUCK
By his Attorneys.

W. P. SHATTUCK.
COMPUTING MACHINE.
APPLICATION FILED MAR. 5, 1901. RENEWED DEC. 30, 1908.

966,248.

Patented Aug. 2, 1910.

7 SHEETS—SHEET 6.

Witnesses
E. G. Staude
M. E. Gooley

Inventor
WILLIAM P. SHATTUCK
By his Attorneys
Paul & Hawley

THE NORRIS PETERS CO., WASHINGTON, D. C.

W. P. SHATTUCK.
COMPUTING MACHINE.
APPLICATION FILED MAR. 5, 1901. RENEWED DEC. 30, 1908.

966,248.

Patented Aug. 2, 1910.
7 SHEETS—SHEET 7.

Witnesses.
E. G. Staude
W. E. Gooley

Inventor.
WILLIAM P. SHATTUCK
By his Attorneys
Paul & Hawley

THE NORRIS PETERS CO., WASHINGTON, D. C.

UNITED STATES PATENT OFFICE.

WILLIAM P. SHATTUCK, OF MINNEAPOLIS, MINNESOTA, ASSIGNOR TO SHATTUCK MANUFACTURING CO., OF MINNEAPOLIS, MINNESOTA, A CORPORATION.

COMPUTING-MACHINE.

966,248.      Specification of Letters Patent.      Patented Aug. 2, 1910.

Application filed March 5, 1901, Serial No. 49,950. Renewed December 30, 1908. Serial No. 470,064.

*To all whom it may concern:*

Be it known that I, WILLIAM P. SHATTUCK, of Minneapolis, Hennepin county, Minnesota, have invented certain Improvements in Computing-Machines, of which the following is a specification.

This invention relates to improvements in machines for making computations, and particularly to improvements and modifications pertaining to or connected with the machine shown and described in Letters Patent of the United States No. 647,238, issued to me April 10, 1900.

The machine, as herein shown, is designed especially for adding numbers, and while I have not shown, in this application any means for printing or listing the results of the additions or computations, I wish it to be understood that I may use, and contemplate using, in connection with the machine as herein shown, suitable printing or listing attachments, such for example as those shown and described in my patent hereinbefore referred to.

The invention consists generally in the novel constructions hereinafter described and particularly pointed out in the claims.

Figure 1:
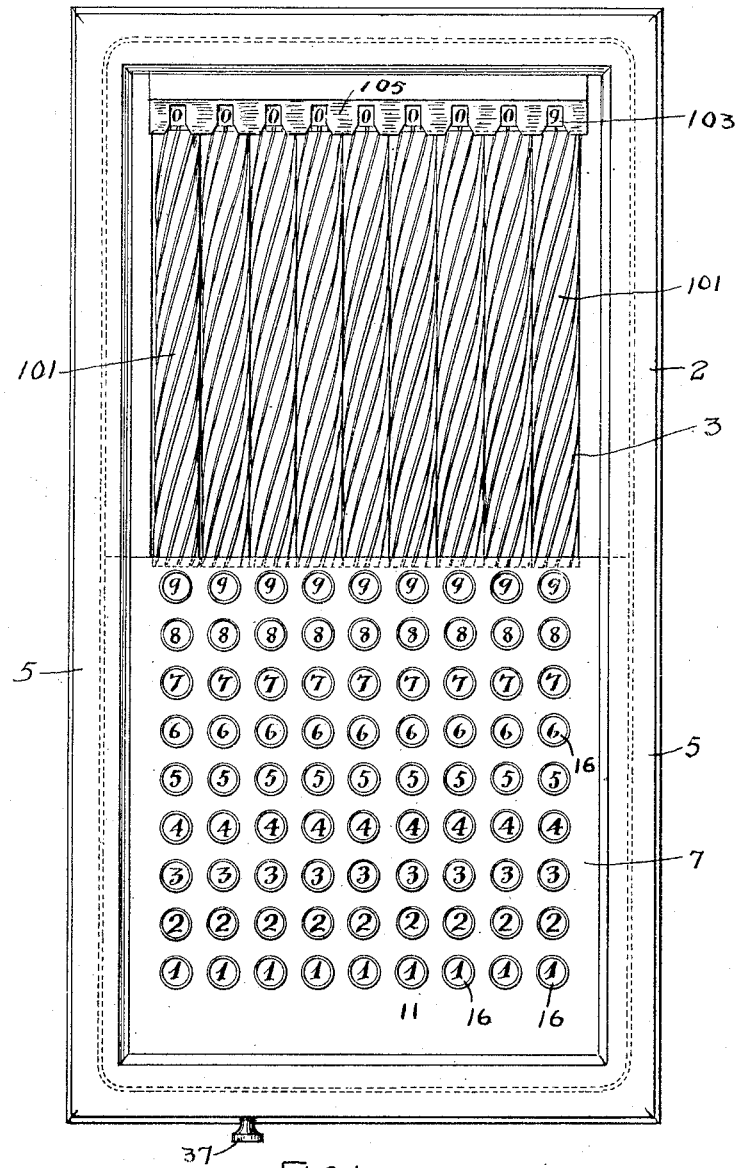
Figure 2:
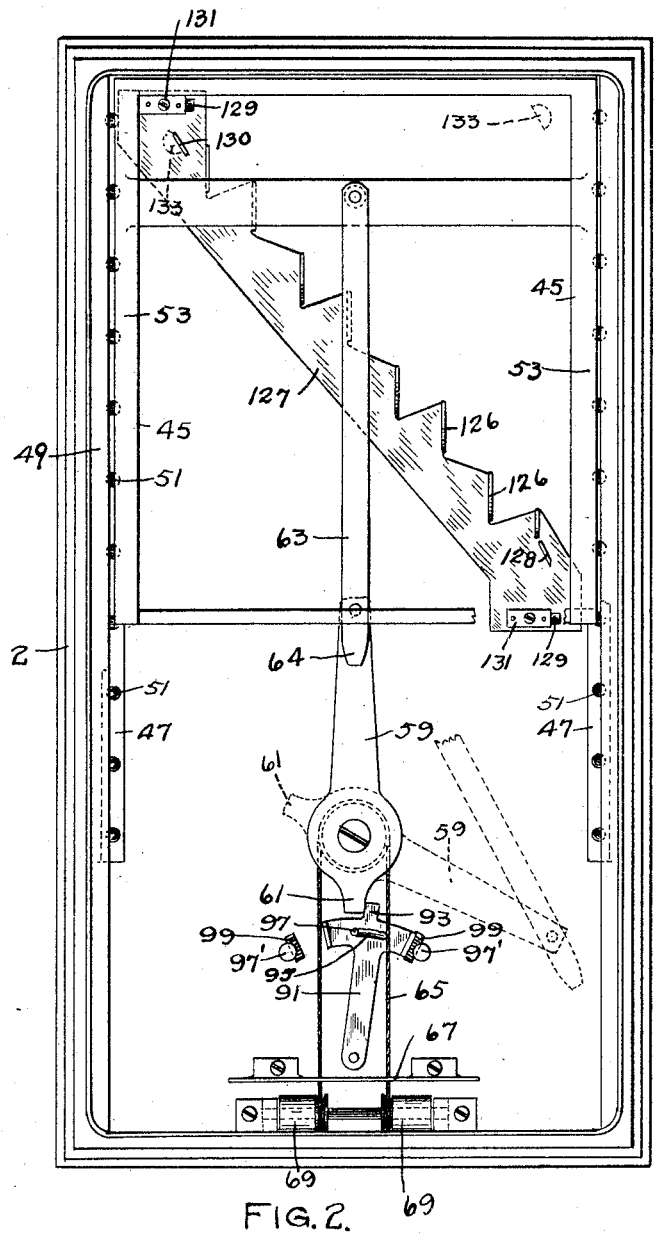
Figure 6:
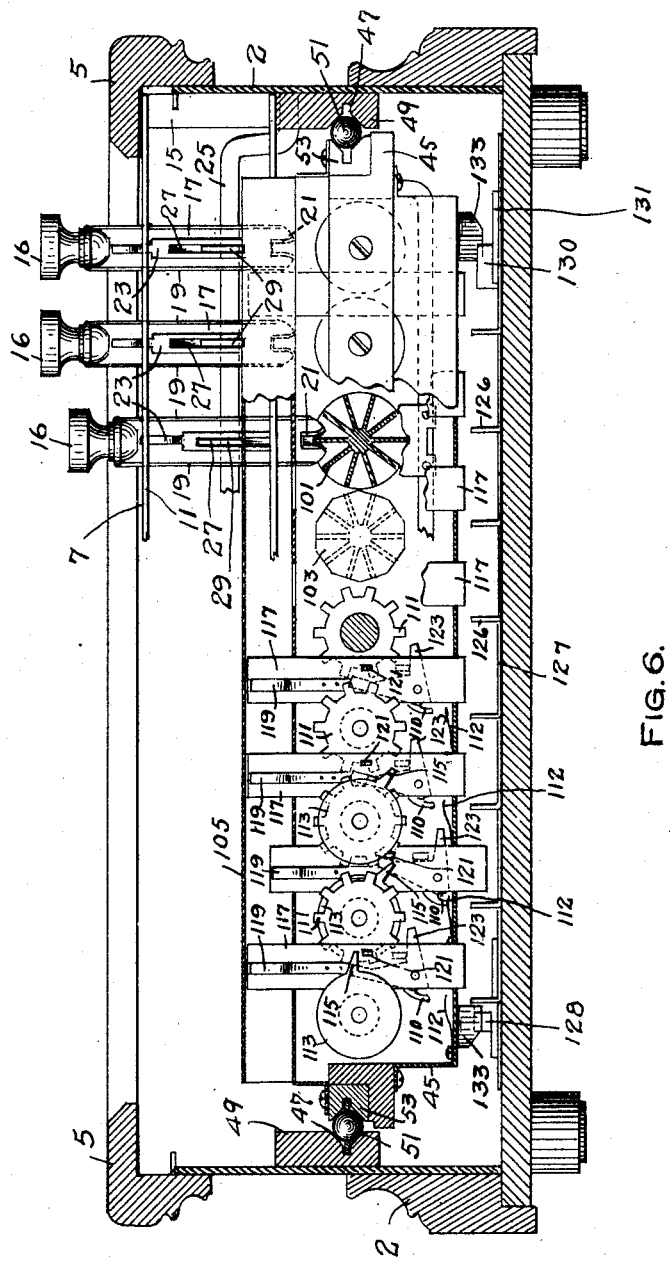
Figure 9:
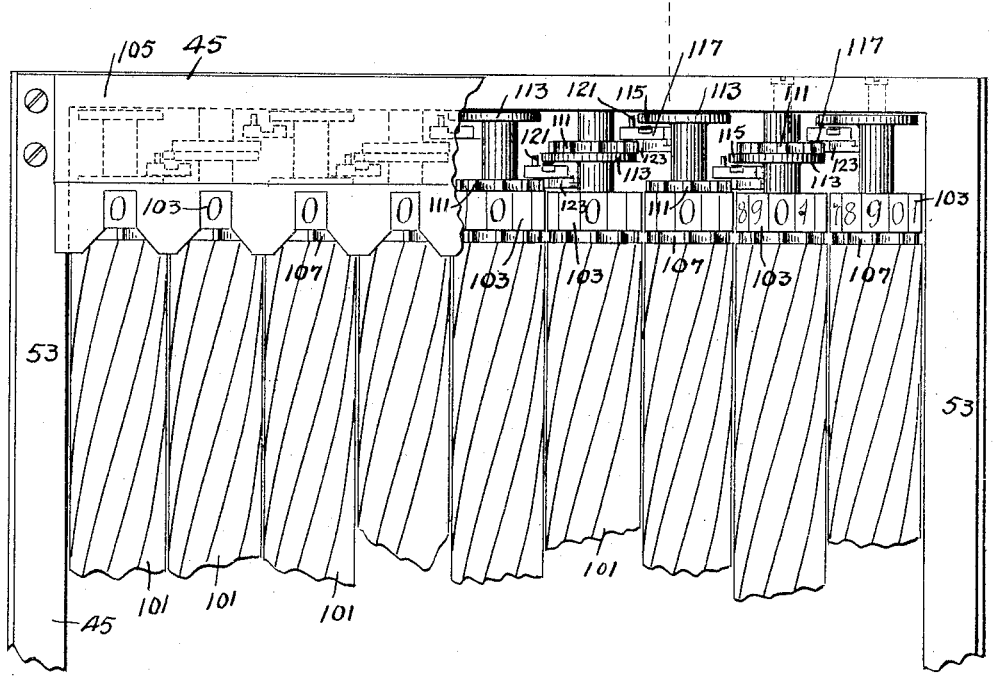
Figure 10:
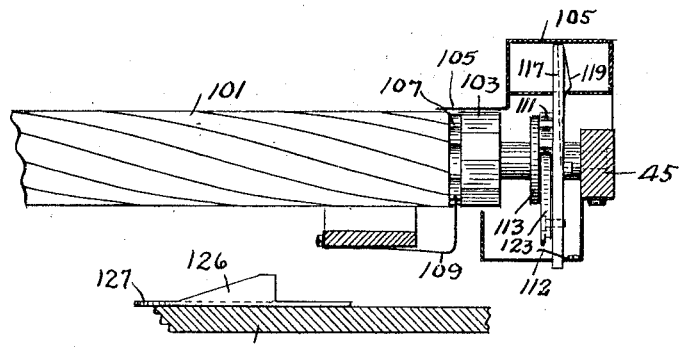
Figure 11:
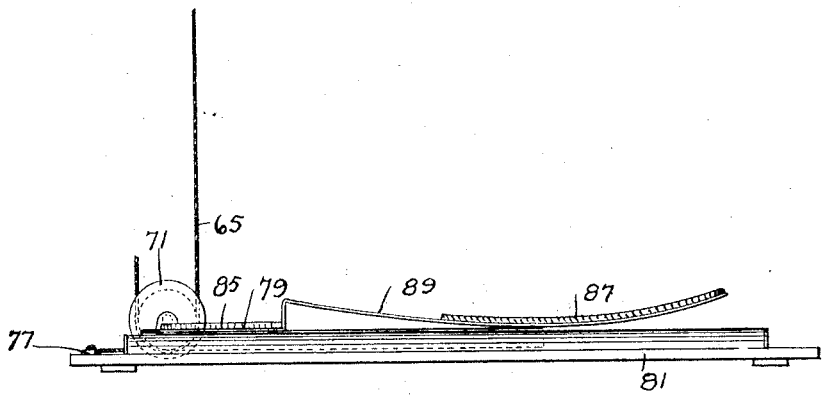
Figure 12:
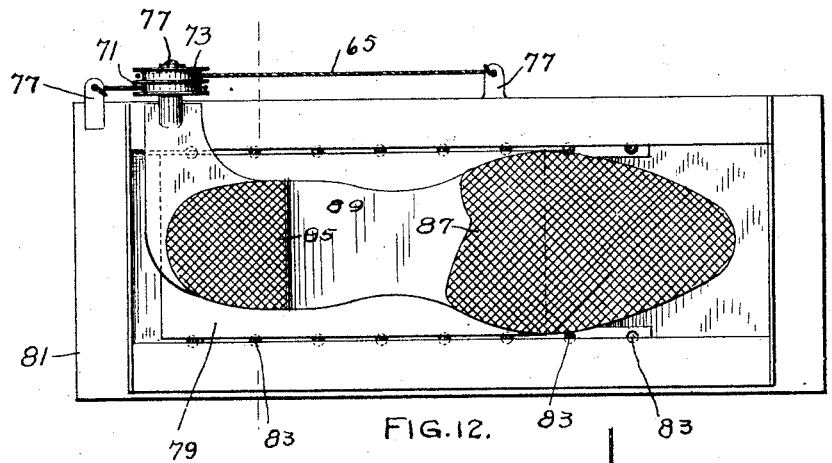
Figure 13:
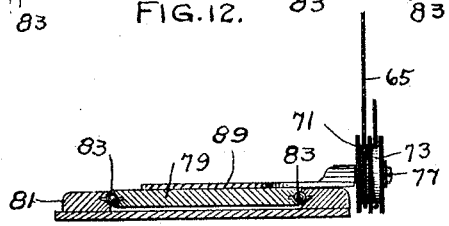

In the accompanying drawings forming part of this specification, Figure 1 is a plan view of a computing machine embodying my invention. Fig. 2 is a plan view showing the frame of the machine and the carriage which supports the spiral shafts and registering or typewheels, and showing also the means for moving said carriage. Fig. 3 is a longitudinal vertical section of the machine, the key-board and carriage, and the carriage operating mechanism being shown in elevation. Fig. 4 is a view similar to Fig. 3, but showing the carriage at the opposite end of its travel. Fig. 5 is a detail of the key-restoring device. Fig. 6 is a transverse vertical section of the machine, one of the keys being shown in its depressed position and in engagement with one of the spiral shafts. Fig. 7 is a longitudinal sectional view of the key-board. Fig. 8 is a plan view of the key-board with the top plate partly broken away to show the construction of the key-restoring devices. Fig. 9 is a detail plan of a portion of the carriage showing the spiral shafts and registering or type-wheels carried thereby. Fig. 10 is a detail of a portion of one of the spiral shafts and illustrating the mechanism for carrying from one of the type or registering wheels to another. Figs. 11, 12 and 13 are details of the treadle device that may be employed for operating the carriage.

*The casing.*—In the drawings 2 represents the case of the machine, which may be of any suitable or preferred form of construction. I have shown in the drawings a rectangular metallic case within which the mechanism is arranged and upon which the key-board is supported. In the rear of the key-board I preferably arrange a suitable glass plate 3, which covers the sliding carriage and the spiral shaft carried thereby and through which the registering or type-wheels may be seen. A removable rectangular frame 5 is preferably arranged to rest upon the upper part of the casing, and this frame is provided with a flange that extends over the edge of the glass plate 3 and over the edge of the key-board 7, and holds both the plate and the key-board in position. By removing the frame 5 which may be done by simply lifting it off the casing the glass plate and the key-board may be readily removed and access may be had to all the mechanism of the device.

*The key-board and keys.*—The key-board 7 consists of a suitable metallic frame, preferably constructed of an upper plate 11 and a lower plate 13, both secured to the suitable side-plates 15. The keys 16 are mounted in the key-board so as to move vertically therein, and each of said keys consists of a bar or plate 17 provided at each edge with a suitable flange 19, and provided at its lower end with a notch 21. Each key is also preferably slotted vertically and is provided with a spring 23 which is adapted to engage the plate 11 at the edge of the slot through which the key passes and to hold said key either in its elevated or its depressed position. These keys are provided at their upper ends with the usual buttons or tops having suitable figures or characters thereon. The keys are arranged in rows running from the front to the back of the key-board, and I prefer to make the keys all of the same length, so that the top of the key-board may be flat or level. I do not limit myself, however, to this detail of the construction. Each of the keys passes through slots in the plates 11 and 13 of the key-board and are held in position by said plates while being free to slide vertically within given limits.

The spring 23 with which each of the keys is provided is preferably arranged between the two flanges 19 and against the plate 17 of the keys. This spring projects through the slot in the plate 11 through which the key passes and is provided with a suitable rib formed preferably by making a depression in the back side of the spring, and the spring engages the plate 11 either below or just above this rib. By this means the key will be held by the spring either in its elevated or in its depressed position. When any key is depressed the spring 23 connected therewith is compressed and the key passes to its lower position, as illustrated by the left-hand key shown in Fig. 6. Normally all of the keys are held in their elevated position, as shown by all of the keys except the one at the right-hand in Fig. 7. The plates 11 and 13 being parallel with each other the slots in said plates form guides for the keys, and thus cause them to always move in a vertical or substantially vertical direction. Mounted in bearings on the key-board are the two crank-shafts 25, each of which is provided with a crank at each end. The ends of these cranks are mounted in bearings in the key-board frame and each shaft is capable of swinging upon its bearing, as illustrated by the full and dotted lines in Fig. 7. Each of the keys has a vertical slot 27 extending through it, these slots preferably extending both through the key and through its spring 23, and a bar 29 is passed through each row of keys and is provided with notches near its ends which engage the crank-shaft 25 (see Figs. 6 and 7). Located at the forward end of the key-board is a vertical slide 31 held in suitable guides upon a bracket 33, and this slide extends through a slot in the lower plate 13 of the key-board. The upper end of the slide is provided with the slotted projections 35 that engage one of the crank-shafts 25 and the lower end is provided with a cam-face (see Fig. 5). The slide 31 is adapted to be engaged and raised each time the sliding carriage is moved forward, as hereinafter described, and the upward movement of this slide causes the crank-shaft with which it is engaged to be turned on its bearings, raising it from the position shown in full lines in Fig. 7 to the position shown in dotted lines in the same figure. The other crank-shaft 25 is correspondingly turned and the bars 29 are all raised, moving them from the position shown by full lines in Fig. 7 to the position shown by dotted lines in the same figure. As the bars are raised they strike against the upper ends of the slots in the keys and raise all the keys, that have been depressed, into elevated position. The projections on the springs 23 will pass through the slots in the plates 11 and bear upon the upper surface of the plate, and by this means all of the keys will be held in elevated position until again depressed by the operator. As it is desirable to raise the keys at times without operating the carriage, as for instance, when the operator has depressed a key by error, I provide means whereby all of the keys may be elevated without operating the carriage. This means consists of a key 37 projecting preferably forward from the key-board and through the wall of the casing, as shown in Figs. 1, 3 and 4. This key is secured to or formed integrally with a slide 39 arranged on the bottom plate 13 of the key-board, said plate being slotted and secured in position by a suitable lug 41 (see Fig. 8). The inner end of the key 37 is inclined (see Fig. 7) and this inclined end of the key is arranged to engage one of the crank-shafts 25, so that by pushing in the key the shaft may be turned and the bars 23 elevated, thereby raising the keys in the same manner as is done by raising the slide 31.

For economy in construction I may form the springs 23 integrally with the keys 17, in which case the springs will be constructed by slotting the keys and pressing the tongues thus formed into the shape required for the springs. If preferred, however, the springs may be formed separately and may be secured to the keys by any suitable means. The key-board 7 with the keys and the other parts carried by the key-board, is preferably made so as to be separable and readily detachable from the machine. The sides of the key-board frame are for this purpose, preferably provided with the lugs or projections 43 (see Fig. 8), which are adapted to engage with bayonet-joint slots in the wall of the casing (see Fig. 3). The key 37 is also received in a slot in the upper part of the casing. By removing the frame 5, and the glass or plate 3, the key-board can be pushed backward so as to carry the lugs 43 under the vertical portions of the bayonet-joint slots, and then the key-board frame, the keys, and all parts carried by the key-board, may be lifted out of the machine. For the purpose of locking the bars 29 on the crank-shafts 25, I provide grooves 26 in said crank-shafts, these grooves being of sufficient depth so that the notches in the bars 29 will slip over the shaft in such notch. The crank-shaft is capable of a slight sidewise movement and it may then be moved so that the larger part of the shaft comes into the notches in the bars. By this means the bars are all locked on the crank-shafts and can only be removed when the crank-shafts are moved laterally a sufficient distance to bring the grooved parts of the shafts into the notches in the bars. As the key-board fits snugly within the casing the crank-shafts can be moved laterally in the key-board only when the key-board is removed from the machine, so that when the key-board is in position in the machine it is impossible for the bars 29 to become separated from the shafts 25.

*The movable carriage.*—Mounted in the casing of the machine is a suitable carriage 45 that is adapted to slide horizontally in the casing from the position shown in Fig. 3, where the carriage is under the glass or plate 3, to the position shown in Fig. 4, where the carriage is under the key-board. The casing is provided with suitable horizontal slides 47 (see Fig. 2), supported in ways 49 on the walls of the casing and provided with anti-friction rolls 51. The sides of the carriage are provided with suitable rails 53 that engage the slides 47 and are supported by the rolls 51. Upon these supports the carriage is adapted to reciprocate freely within the casing. The carriage consists of a rectangular frame and it may be moved back and forth in the casing by any suitable means, such as the crank arm and handle shown in my former patent hereinbefore referred to. I have shown, and prefer to use, a crank-shaft connected to the carriage and operated by a suitable treadle, as the means for reciprocating the carriage. For this purpose a short shaft 55, (see Figs. 3 and 4) provided with a pulley or drum 57, is mounted in the lower part of the casing, and this shaft is provided with the crank-arm 59, and also with the projection 61. The end of the crank-arm 59 has pivoted to it a connecting rod 63, the opposite end of which is pivoted at or near the rear end of the carriage 45. A suitable cord 65 is passed around the pulley 57, is carried under a guide 67 and over guide-rolls 69, and the lower ends of the cord are passed under the pulleys 71 and 73 upon the foot-slide 79. The ends of the cord are secured to the lugs or projections 77 that are provided on the frame 81 of the foot-slide. The foot-slide consists of a suitable plate 79 mounted on anti-friction rollers 83 in the frame 81. This slide carries the rollers 71 and 73 that are mounted upon suitable studs 77. The slide is also preferably provided with the rubber or leather plates 85, 87 upon which the foot of the operator is adapted to rest. These plates may be secured to the foot-slide by means of a sheet-metal plate 89, suitably shaped to conform substantially to the bottom of the shoe of the operator.

Arranged within the casing is a pivoted stop-plate 91 provided with a stop-lug 93 and a slot 95. A pin 97 passes through the slot 95 into the bottom of the casing and limits the movement of the stop-plate. Lugs 97' are also preferably arranged upon the bottom of the casing and the rubber or leather blocks 99 are provided in connection with said lugs and are adapted to be engaged by the stop-plate 91 at each limit of its movement. When it is desired to move the carriage the operator moves the foot-slide, either forward or back, as the case may be. A complete forward or backward movement of the foot-slide gives the shaft 55 a complete revolution, and, through the crank-arm 59 and connecting-rod 63 moves the carriage 45 forward from the position shown in Fig. 3 to the position shown in Fig. 4, where it is under the key-board, and then back again to the position shown in Fig. 3. The shaft 55 makes a complete revolution, moving until the projection 61 strikes against the lug 93, by which means further movement of the shaft is prevented. It will be seen that the carriage is moved by moving the foot-slide in either direction, and that a forward or a backward movement of the foot-slide imparts a complete forward and backward movement to the carriage. The connecting rod 63 is preferably provided with the projecting end 64 (see Figs. 2, 3 and 4), and when the carriage reaches the limit of its forward movement this projection passes under the cam face of the slide 31 on the key board and over the guide 67 (see Fig. 5) and raises the slide 31, thereby restoring all of the keys to their elevated position.

*The spiral shafts and registering wheels.*— Mounted in suitable bearings in the carriage and adapted to rotate freely upon such bearings, are the series of spirally grooved shafts 101. These shafts extend lengthwise of the casing parallel with each other, and I have shown in the drawings the carriage provided with nine of such shafts. Each of these shafts is provided with a polygonal registering or type-wheel 103. Each of these wheels is provided with ten figures or characters running from 0 to 9, and a suitable plate 105 is arranged on the carriage over the rear ends of the shafts and is provided with notches or openings in its forward edge through which the top figure or character on each wheel 103 may be seen (see Fig. 9). Each of said shafts has also a notched wheel 107 adapted to be engaged by a spring dog 109 (see Fig. 10), and by this means the shaft is prevented from accidental rotation, though being free to turn at any time under the operation of the proper mechanism. The manner of operating the spiral shafts is substantially the same as that employed in my former patent. The keys on the key-board, representing the numbers that are to be added, are depressed, and the foot-slide is operated so as to move the carriage forward and back. As the carriage is moved forward each of the spiral shafts that is in line with one of the depressed keys will be engaged at the proper moment by such depressed key, and the shaft will thereafter be rotated during the remainder of the forward movement of the cariage. When the carriage reaches the forward limit of its movement the keys will be elevated in the manner already described and the shafts will remain stationary during the backward movement of the carriage except as the same are operated in the process of carrying from one registering wheel to another, in the manner hereinafter described.

*The carrying device.*—It is necessary to provide in connection with the spiral shaft and the registering wheels a carrying device which will cause each wheel in the series to be turned one step each time that the preceding wheel in the series makes a complete revolution. While I do not limit myself to the specific carrying device which I have shown and described herein, yet I consider this device well adapted for the purpose set forth. Each shaft, except the first, or that carrying the units wheel, is provided with a wheel 111, and each of said wheels has ten teeth and ten notches or recesses between said teeth. Each of said shafts is also provided with a disk 113 provided with a long tooth or projection 115. Mounted in a suitable support in the carriage so as to be capable of sliding vertically, is a part that I term the vertical slide 117. There are a series of these slides and each is provided with a spring 119 that passes through the slot in the support through which the slide 117 also passes. This spring operates in the same manner as the springs that are connected with the vertically moving keys, and said spring tends to hold said slide in an elevated position, while permitting it to be depressed, as required. Each of said slides is provided with a lug or projection 121 adapted to be engaged by the projection 115 on the preceding disk 113. The slides 117 also carry the pivoted dogs 123, said dogs being provided with the projections 110. When the slides 117 are elevated these dogs stand in a substantially vertical position, as indicated by the two dogs at the right hand in Fig. 6 and the one dog at the left hand of said figure. Each time one of the spiral shafts makes a complete revolution the projection 115 carried by the corresponding disk 113 engages the lug 121 on one of the slides 117 and depresses said slide, so that its spring passes out of the slotted plate, through which it usually passes, and the slide is thrown down into its lowermost or depressed position, as indicated by the second slide from the left in Fig. 6 of the drawings. As the slide is depressed a projection 110 on the pivoted dog strikes a spring 112 which turns the dog on its pivot and throws its upper end into one of the notches of the next wheel in the series, and when said slides are elevated by the means hereinafter described, each of the wheels 111 is turned one notch by reason of the engagement of the dog with said wheel. In this way each time any one of the shafts makes a complete revolution the next succeeding shaft is turned one notch of its wheel 111. It will be seen therefore that it is necessary to provide some means for raising the slides as the carriage is moved backward, and that this device must operate the slides in order so that the wheels may properly carry from one to the other. For this purpose I provide inside of the casing but on the bottom thereof, the inclined cam plate 127. This plate has a series of cams or inclines upon it (see Fig. 4), and it is capable of slight horizontal movement, being provided with the slots 129, which are engaged by screws passing through the clamping plates 131. The cam plate is provided with two inclined lugs 128 and 130, and the underside of the carriage is provided with inclined lugs 133 (see Fig. 2). By this means as the carriage continues its forward movement one of the lugs 133 engages the lug 130 and gives to the plate a slight lateral movement as far as may be permitted by the slots in said plate. This first movement of the plate 127 brings all of the cams 126 thereon out of line with the slides 117, so that as said carriage is moved forward none of said slides are engaged by said cams 126. At the beginning of the return movement of the carriage the cam 128 is engaged by one of the projections 133 on the carriage and the sliding plate 127 is moved back to its former position or as far as it can move by reason of its slotted connection. When the cam plate has thus been shifted, all of its cams will be brought into line with the slides 117, and as said carriage returns to its original or rear position, these slides will pass over the cams 126 on the cam plate 127 and all of the cams that have been depressed will now be elevated, causing the dogs carried by the depressed slides to engage the notched wheels on the next succeeding shafts and turn each of the same one notch, thereby giving a similar movement to the registering wheel and adding one to the amount indicated by each of said wheels. It will be noted that the cam plate 127, is in a diagonal position, so that the cams operate in succession, that is to say, if the slide that is depressed by the revolving of the units shaft is in its lower position, said slide is first raised, causing the next shaft and wheel to be turned, and after this is done the next slide is raised, and so on in order. This permits the proper carrying from one registering wheel to the next higher throughout the entire series.

*Operation of the machine.*—The operation of the machine will be readily understood from the foregoing detailed description of the construction. In beginning to use the machine the spiral shafts are first set so that the zero character is uppermost on each of the registering wheels and shows through the slotted plate and through the glass plate at the top of the casing. The keys, representing the first number to be used in the computation, are depressed and the operator then moves the foot slide, thereby causing the carriage to be moved forward and as the carriage passes under the key-board those keys that have been depressed will each engage and turn the corresponding spiral shaft so as to bring the number or character on the registering wheel that corresponds with the number of the depressed key in the row that is in line with that particular shaft, uppermost. During this forward movement of the carriage and the shafts, each shaft will remain stationary on its bearings, unless one key that is in line with said shaft has been depressed, and the time when each spiral shaft will begin to rotate will depend upon the key that is depressed. For instance, if the key that is marked 9 is depressed the shaft will begin to rotate almost immediately when the carriage begins to advance, and it will continue to rotate during the remainder of the forward movement of the carriage. If, however, the key that is depressed is the key that is numbered 1, then the shaft in line therewith will not begin to rotate until the carriage has very nearly reached the limit of its movement, and the corresponding registering wheel will be turned only one step, or one-tenth of a revolution. Each shaft will remain stationary unless a key in line with the shaft has been depressed. The carriage moves forward the full extent of its movement and the keys that have been depressed are restored to their elevated position, just as the carriage reaches the limit of its forward movement, by the engagement of the extension 64, on the connecting rod 63, with the vertically moving slide 31. As before described, this raises all of the keys that have been depressed into their elevated position where they are held by the springs on the keys. As soon as the keys are elevated the spiral shafts are freed from the devices that rotate them, and upon a return movement of the carriage these shafts will all remain stationary except as they may be turned in the carrying operation. In the carrying operation each shaft that makes a complete revolution will, as already described, cause the next adjacent vertical slide to be depressed. Upon the return movement of the carriage such slide will be raised by being engaged by the cam on the cam plate 127, and the raising of the slide will cause the next wheel and spiral shaft to be turned one-tenth of a revolution, thus carrying 1 from the preceding wheel to the wheel of the next higher denomination.

While I have shown the machine adapted only for addition, it may, if preferred have listing attachments so as to print either the amount of each number that is added, or the total, at any time, or it may be constructed so that, as in my former patent, it will print each number that is added or registered, and will, at any time, print the full amount shown by the registering wheels. The machine may also be constructed to multiply, divide or subtract.

I do not limit myself to the details of the construction herein shown and described, as the same may be varied in many particulars without departing from my invention.

I claim as my invention:

1. The combination, with a key-board provided with a series of movable keys, of a sliding carriage, a spiral shaft mounted on said carriage and a registering wheel mounted upon said shaft, whereby as said carriage is moved said spiral shaft and the registering wheel mounted thereon may be rotated by engagement of said shaft with a previously operated key of said key-board.

2. The combination, with a key-board provided with a series of movable keys, of a sliding carriage, a series of registering wheels mounted on said carriage, a series of spiral shafts also mounted on said carriage and carrying said registering wheels, whereby as the said carriage is moved said spiral shafts and said registering wheels may be rotated by engagement of said shafts with the previously operated keys.

3. The combination, with a key-board provided with a series of movable keys, of a series of spiral shafts, and a support therefor, a registering wheel mounted upon each of said spiral shafts, and means for moving the shaft support along said key-board and thereby causing the registering wheels to be operated by engagement of the spiral shafts with selected and previously operated keys on said key-board.

4. The combination, with a key-board provided with a row of independent keys numbered from 1 to 9, of a sliding carriage, provided with a spiral shaft in line with and engageable by said keys, and a registering wheel mounted upon said shaft, whereby as said carriage is moved said registering wheel is rotated by engagement of said spiral shaft with any previously operated key of said row.

5. The combination, with a key-board provided with a series of movable keys, of a sliding carriage, a spiral shaft mounted upon said carriage and adapted to be engaged by said keys, a registering wheel mounted upon said shaft, and foot-operated mechanism for moving said carriage.

6. The combination, with a key-board provided with a series of movable keys, of a sliding carriage, a series of registering wheels mounted on said carriage, a series of spiral shafts connected with said wheels, and adapted, as said carriage is moved, to engage previously operated keys of said key-board, and a foot-operated mechanism for moving said carriage.

7. The combination, with a key-board provided with a series of movable keys, of a reciprocating carriage, registering wheels mounted upon said carriage, foot-operated mechanism for reciprocating said carriage, and means movable with relation to the keys causing said wheels to be turned by said keys as said carriage is reciprocated, for the purpose set forth.

8. The combination, with the casing and the reciprocating carriage provided with the series of registering wheels and transmitting mechanism, of the key-board and the series of movable keys arranged thereon, a crank-shaft connected with said carriage, and a foot-operated mechanism connected with said crank shaft, for the purpose set forth.

9. The combination, with the casing, of the removable key-board 9 provided with the upper and lower plates 11 and 13 and the series of independent movable keys supported in said plates, for the purpose set forth.

10. The combination, with a suitable casing, a series of registering wheels and transmitting mechanism therefor, of a removable key-board 9 provided with an upper plate 11 and a lower plate 13, and a series of movable keys supported in said key-board, for the purpose set forth.

11. The combination, with the key-board provided with the upper and lower plates, of the depressible keys mounted in said plates, bars 29 arranged within said key-board and connected with said keys, and means for raising said bars and said keys, for the purpose set forth.

12. The combination, with the key-board, provided with the plates 11 and 13, the series of movable keys mounted in slots in said plates and provided with springs 23, bars 29 arranged between said plates and engaging said keys, crank-shafts 25 connected with said bars, and means for moving said shafts and bars and thereby elevating said keys, for the purpose set forth.

13. The combination, with the key-board and keys, of the crank-shaft 25 provided with the grooves 26, the bars 29 provided with notches adapted to engage the grooved portions of said bars, and means permitting the movement of said shafts in the notches in said bars, for the purpose set forth.

14. The combination, with the reciprocating carriage, of the registering wheels mounted upon said carriage, a series of depressible slides also mounted upon said carriage, means for depressing each of said slides when the preceding wheel has made a complete revolution, a dog carried by said slide adapted when the slide is depressed to engage the next succeeding wheel, and means operated upon the return movement of the carriage for elevating said slide, for the purpose set forth.

15. The combination, with the reciprocating carriage, the registering wheels and carrying devices mounted on said carriage, of the diagonally arranged cam plate over which said carriage passes while it is being reciprocated, for the purpose set forth.

16. The combination, with the reciprocating carriage, of the series of registering wheels mounted upon said carriage, the movable slide 117 also mounted upon said carriage, and the laterally movable cam plate 127 arranged below said carriage, for the purpose set forth.

17. The combination, with the reciprocating carriage, of the series of registering wheels mounted upon said carriage, the series of depressible slides 117 mounted upon said carriage and provided with the dogs 123, means for depressing one of said slides each time the preceding wheel has made a complete revolution, and means for elevating said slides and thereby moving the next succeeding wheel one step, for the purpose set forth.

18. The combination, with the reciprocating carriage, of the series of registering wheels mounted upon said carriage, the vertically moving slides 117 provided with springs 119 and carrying the pivoted dogs 123, springs 112 adapted to engage said dogs, the disks 113 provided with projections 115 adapted to engage and depress said slides, and a cam plate provided with a series of cams 126 adapted to engage and elevate said slides, for the purpose set forth.

19. The combination, with the reciprocating carriage, of the shaft 55 provided with the crank-arm 59 and with the projection 61, means connecting said crank to said carriage, and a pivoted stop plate 91 provided with a stop lug 93, for the purpose set forth.

20. The combination, with the reciprocating carriage, and its operating crank and drum, of the sliding foot-plate, and suitable cords connecting said drum and said foot-plate, for the purpose set forth.

21. The combination, with the reciprocating carriage, the operating crank and drum, of the sliding foot-plate, suitable pulleys upon said foot-plate, and a suitable cord extending from said drum under the pulleys on the foot-plate and connected to suitable stationary supports, whereby a forward or backward movement of said foot-plate produces a forward and backward movement of said carriage, for the purpose set forth.

In testimony whereof I have hereunto set my hand this 28th day of February, 1901, at Minneapolis, Minn.

WILLIAM P. SHATTUCK.

In presence of—
A. C. PAUL,
C. V. HAWLEY.